United States Patent
Lee et al.

(10) Patent No.: US 11,648,429 B2
(45) Date of Patent: May 16, 2023

(54) FIRE EXTINGUISHING SYSTEM FOR TIRE OF VEHICLE

(71) Applicants: Hyundai Motor Company, Seoul (KR); Kia Motors Corporation, Seoul (KR)

(72) Inventors: Chi Woo Lee, Jeollabuk-do (KR); Hyeon Gi Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 249 days.

(21) Appl. No.: 17/093,014

(22) Filed: Nov. 9, 2020

(65) Prior Publication Data
US 2021/0283440 A1  Sep. 16, 2021

(30) Foreign Application Priority Data
Mar. 11, 2020  (KR) .................... 10-2020-0029922

(51) Int. Cl.
*A62C 3/07* (2006.01)
*A62C 37/36* (2006.01)
(Continued)

(52) U.S. Cl.
CPC .............. *A62C 3/07* (2013.01); *A62C 35/023* (2013.01); *A62C 37/04* (2013.01);
(Continued)

(58) Field of Classification Search
CPC ........... A62C 3/07; A62C 3/0207; A62C 3/08; A62C 37/04; A62C 35/023; B60Q 5/005;
(Continued)

(56) References Cited

U.S. PATENT DOCUMENTS

2004/0216903 A1* 11/2004 Wierenga ............... A62C 35/58
169/85
2004/0226726 A1* 11/2004 Holland .................. A62C 3/07
169/62
(Continued)

FOREIGN PATENT DOCUMENTS

EP           2234825      *  2/2009  ............. B60C 23/04
JP     2004-196032 A        7/2004
(Continued)

Primary Examiner — Christopher R Dandridge
(74) Attorney, Agent, or Firm — Fox Rothschild LLP

(57) ABSTRACT

A fire extinguishing system for a tire of a vehicle is capable of effectively responding to a fire in all tire areas of the vehicle, and of spraying fire extinguishing agent selectively only for the tire having the fire, thereby performing effective fire extinguishing. The fire extinguishing system includes: a fire detection sensor configured to detect the fire in the tire of the vehicle; a fire control unit configured to receive a signal output from the fire detection sensor and to output a control signal for spraying fire extinguishing agent when the fire control unit determines a fire occurrence; and a plurality of fire extinguishing agent sprayers configured to spray the fire extinguishing agent toward the tire having the fire according to the control signal output by the fire control unit, in a state of being filled with the fire extinguishing agent therein.

16 Claims, 8 Drawing Sheets

(51) Int. Cl.
  *B60C 23/04*    (2006.01)
  *B60C 23/20*    (2006.01)
  *A62C 35/02*    (2006.01)
  *B60C 19/00*    (2006.01)

(52) U.S. Cl.
  CPC .......... *B60C 23/0435* (2013.01); *B60C 23/20* (2013.01); *B60C 2019/004* (2013.01)

(58) Field of Classification Search
  CPC ...... B60Q 1/52; B60Q 3/07; B60C 2019/004; B60C 23/0435; B60C 23/20
  See application file for complete search history.

(56) References Cited

U.S. PATENT DOCUMENTS

| | | |
|---|---|---|
| 2006/0278412 A1 | 12/2006 | Hodges et al. |
| 2013/0186654 A1* | 7/2013 | Dunster .................. A62C 3/07 169/62 |
| 2016/0279453 A1 | 9/2016 | Ernfjall |

FOREIGN PATENT DOCUMENTS

| | | | |
|---|---|---|---|
| KR | 1998-052429 | 10/1998 | |
| KR | 10-2016-0012282 A | 2/2016 | |
| KR | 102050140 B1 | 11/2019 | |
| WO | WO2006130363 | * 12/2006 | ............... A62C 3/07 |

\* cited by examiner

FIRE EXTINGUISHING SYSTEM FOR TIRE OF VEHICLE

CROSS REFERENCE TO RELATED APPLICATION

The present application claims under 35 U.S.C. § 119(a) the benefit of Korean Patent Application No. 10-2020-0029922, filed Mar. 11, 2020, the entire contents of which are incorporated by reference herein.

BACKGROUND

(a) Technical Field

The present disclosure relates to a fire extinguishing system for a vehicle, more particularly, to the fire extinguishing system capable of automatically detecting and extinguishing a fire occurring a tire of the vehicle.

(b) Description of the Related Art

In general, in a vehicle, fuel that is flammable material is used, and a number of heat sources exist along with various entangled electric wirings, which results in a constant risk of fire.

For example, because a high-temperature engine and various electric devices are installed in an engine room, fire may occur when the engine and the electric devices are damaged or malfunction due to a vehicle crash or the like.

In addition, in the engine room, there is a risk of fire during driving due to engine overheating or an exhaust gas post-treatment process.

Recently, as the use of eco-friendly vehicles such as electric vehicles has increased, the risk of fire due to external shocks or internal short circuits has increased in batteries, high-voltage electric wiring, and the like.

However, although furnishing and using a fire extinguisher, as a method of responding to a fire in a vehicle, is a known responding method, when a driver fails to use the fire extinguisher in a timely manner, it becomes difficult or impossible to extinguish an initial fire and the fire may spread throughout the vehicle.

Moreover, in the case of a public transportation vehicle such as a bus, many passengers may be on board, so fire prevention management for passenger safety is essential, and in the event of a fire, the potential for injury or loss of life is increased.

In addition, because the driver is indoors while driving the vehicle, even though a fire occurs inside the engine room, there may be many cases that the driver does not quickly notice the fire before a large amount of smoke is generated. In particular, in the case of a bus, unlike a passenger car, the engine room is located at the rear of the vehicle, so it is difficult for the driver to be aware of an engine room fire.

Therefore, the driver may not rapidly respond to the fire in an early stage of the fire, and the fire may spread and lead to combustion of the vehicle, thus increasing the risk of human injury and significant damage to the vehicle.

In addition, even though the driver or passenger in the vehicle interior notices the fire quickly, it is difficult to quickly extinguish the fire with only a portable fire extinguisher provided in the vehicle.

Accordingly, it is known to provide a fire extinguishing system capable of quickly extinguishing a fire by automatically spraying fire extinguishing agent toward an ignition point when a fire is detected in the engine room of the vehicle.

In an existing engine room fire extinguishing system, when a fire occurs in the engine room, high pressure nitrogen charged in the nitrogen tank is supplied to a cylinder filled with the fire extinguishing agent through a hose by a fire detection signal.

Accordingly, while a piston is operated in the cylinder by high pressure nitrogen, the internal fire extinguishing agent is supplied to the spray line at a high pressure by force generated by the piston, and eventually, the fire extinguishing agent is sprayed through the nozzle of the spray line to the ignition point, thereby extinguishing the fire.

In such an engine room fire extinguishing system, high pressure nitrogen is used as a driving gas for operating the piston, and a tank filled with high pressure nitrogen and a cylinder filled with the fire extinguishing agent are connected through a high-pressure hose.

In addition, the spray line connected to the cylinder is arranged along a predetermined position in the engine room, and a fire detection line for detecting a fire in the engine room is also arranged along a predetermined position in the engine room.

Such a conventional fire extinguishing system may be effective in extinguishing a fire in a limited space in a vehicle.

For example, in a vehicle, a fire generated in a space such as an engine room is automatically detected through a fire detection line disposed in the space, and a fire extinguishing agent charged in the cylinder is injected through a nozzle of a spray line disposed in the space, thereby being useful to extinguish the fire early in the engine room.

However, according to the conventional fire extinguishing system, it is possible to effectively respond to the fire occurring in one space, but it is impossible to prepare for and respond to a fire in a plurality of spaces or regions spaced apart from each other in the vehicle.

For example, it is impossible to cover each of the front, rear, left, and right tires in a vehicle with one system. That is, all areas in which the four tires are arranged in the vehicle are impossible to be covered with the one system. Further, fire extinguishing in all four tire areas using one system is impossible.

That is, although the conventional system can be configured by providing one nitrogen tank and one fire extinguishing agent cylinder in the vehicle and installing a fire detection line and a spray line in all four tire areas, the longer the spray line from the fire extinguishing agent cylinder to the tire area, the weaker the spray pressure of fire extinguishing agent. Accordingly, the fire-extinguishing performance may be degraded in some or all areas.

In particular, in the case of a large vehicle such as a bus or a truck, since a distance between tires may be long as compared to a passenger vehicle, it is impossible to respond to fire(s) in all four tire areas using only one nitrogen tank and a fire extinguishing agent cylinder.

In addition, when applying the conventional fire extinguishing system, there is a problem that the fire extinguishing agent is injected in all four tire areas even though a fire occurs in only one of the four tire areas.

In addition, when the conventional fire extinguishing system is applied, since the extinguishing liquid is sprayed simultaneously at all four tire areas, the nitrogen tank and the fire extinguishing agent cylinder should be operated at high pressure for normal operation.

In addition, when a nitrogen tank and a fire extinguishing agent cylinder are installed in each tire area, the cost will inevitably significantly increase.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a fire extinguishing system for a tire of a vehicle capable of effectively responding to fire for all tire areas of the vehicle and of spraying fire extinguishing agent selectively only for the tire where the fire has occurred after detecting the fire, thereby performing effective fire extinguishing.

In order to achieve the above objective according to one aspect of the present disclosure, there may be provided a fire extinguishing system for a tire of a vehicle, the system including: a fire detection sensor configured to detect an occurrence of tire fire in the tire of the vehicle; a fire control unit configured to receive a signal output from the fire detection sensor and to output a control signal for spraying fire extinguishing agent when the first control unit determines that the fire has occurred; and a plurality of fire extinguishing agent sprayers configured to spray the fire extinguishing agent toward the tire where the fire has occurred according to the control signal the fire control unit outputs, in a state of being filled with the fire extinguishing agent therein.

Here, the fire detection sensor may be a temperature sensor configured to measure a temperature of the tire, and the fire control unit may determine that the fire has occurred at the tire when the temperature of the tire, which the signal of the temperature sensor indicates, is no less than a reference temperature set for deciding the fire occurrence.

In addition, the fire detection sensor may be a tire pressure monitoring system (TPMS) sensor configured to modulate tire state information measured by measuring a tire state to an RF signal and transmits the RF signal, and the fire control unit may include an RF receiver configured to receive the RF signal the TPMS transmits.

Here, the fire control unit may determine that the fire has occurred at the tire when the temperature of the tire, which the signal of the TPMS sensor indicates, is no less than a reference temperature set for deciding the fire occurrence.

In an embodiment of the present disclosure, the fire detection sensor and the plurality of the fire extinguishing agent sprayers may be installed to each of a plurality of the tires in the vehicle, and the fire control unit may be configured to output the control signal for spray operation of the fire extinguishing agent of the fire extinguishing agent sprayers at a tire side where the fire has occurred after identification of the tire where the fire has occurred from the received signal of the fire detection sensor.

In addition, in an embodiment of the present disclosure, each of the fire extinguishing agent sprayers may include: a pressure generator configured to operate for generating spray pressure according to the control signal that the fire control unit outputs, and a fire extinguishing agent tank filled with the fire extinguishing agent therein and provided with a plurality of spray holes through which the fire extinguishing agent is sprayed when the spray pressure generated in the pressure generator acts thereon, wherein the fire extinguishing agent tank is coupled to the pressure generator so that the spray pressure generated in the pressure generator may act on the fire extinguishing agent filled therein.

In addition, in an embodiment of the present disclosure, each of the fire extinguishing agent sprayers further may include: a bracket to be fixed to the vehicle body part of a side above the tire for mounting to the vehicle body; and a cap configured to seal the fire extinguishing agent tank by being screw-coupled to a top portion of the fire extinguishing agent tank, wherein the pressure generator is located in a space defined at an inner side between the cap and the top portion of the fire extinguishing agent tank coupled thereto.

In addition, the pressure generator may include: a pressure plate installed to be movable in a downward direction on a top side of the fire extinguishing agent inside the fire extinguishing agent tank and configured to act spray pressure on the fire extinguishing agent, as being moved downward; a spring installed inside the fire extinguishing agent tank in a compressed state and configured to provide elastic restoring force for acting the spray pressure on the fire extinguishing agent by moving the pressure plate in the downward direction when being elastically restored; a stopper configured to fix the spring in a compressed state; and an actuator configured to allow elastic restoration of the spring to be established by operating to release the fixing of the spring by the stopper according to the control signal that the fire control unit outputs.

In addition, each of the fire extinguishing agent sprayers may further include a cap configured to seal the fire extinguishing agent tank by being coupled to a top portion of the fire extinguishing agent tank, wherein the spring is installed between the cap and the stopper, and a plurality of actuators and the same number of stoppers are installed at equal intervals along a circumferential direction of the cap, whereby the springs are supported in a compressed state by the plurality of the stoppers, respectively.

In addition, a retainer may be installed at the inner side of an upper portion of the fire extinguishing agent tank, wherein the stopper is coupled to the retainer, thereby being slidingly movable in a radial direction for fixing the spring and releasing the fixing of the spring.

In addition, the actuator may include: an actuator body fixedly installed to the cap; a solenoid provided in the actuator body and configured to be driven by electric current being applied thereto, in response to the control signal that the fire control unit outputs; and an actuation rod coupled to the actuator body to be movable back and forth, thereby operating to release the fixing of the spring held by the stopper when the solenoid is driven.

Here, the actuation rod may be located to support the stopper from the rear so that movement of the stopper fixing the spring in a compressed state is prohibited before driving the solenoid, and the actuation rod releases a support state for the stopper, when operated by the driving of the solenoid.

In addition, the stopper may be provided to support from the bottom the spring, located between the cap and the stopper at an inside of an upper portion of the extinguishing agent tank, and an inclined surface may be provided on an upper portion of a front surface of the stopper, and the spring is supported on the inclined surface, so when the support state of the stopper held by the actuation rod is released, the stopper moves in a direction to release the fixing of the spring by the elastic restoring force of the spring.

As described above, according to the fire extinguishing system for the tire according to the present disclosure, the system is capable of effectively responding to fire for all tire areas of the vehicle and of automatically spraying the fire extinguishing agent selectively only for the tire where the fire has occurred after detecting the fire, thereby performing more effective, rapid, and precise extinguishing of the fire compared with the case where a conventional system is applied.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
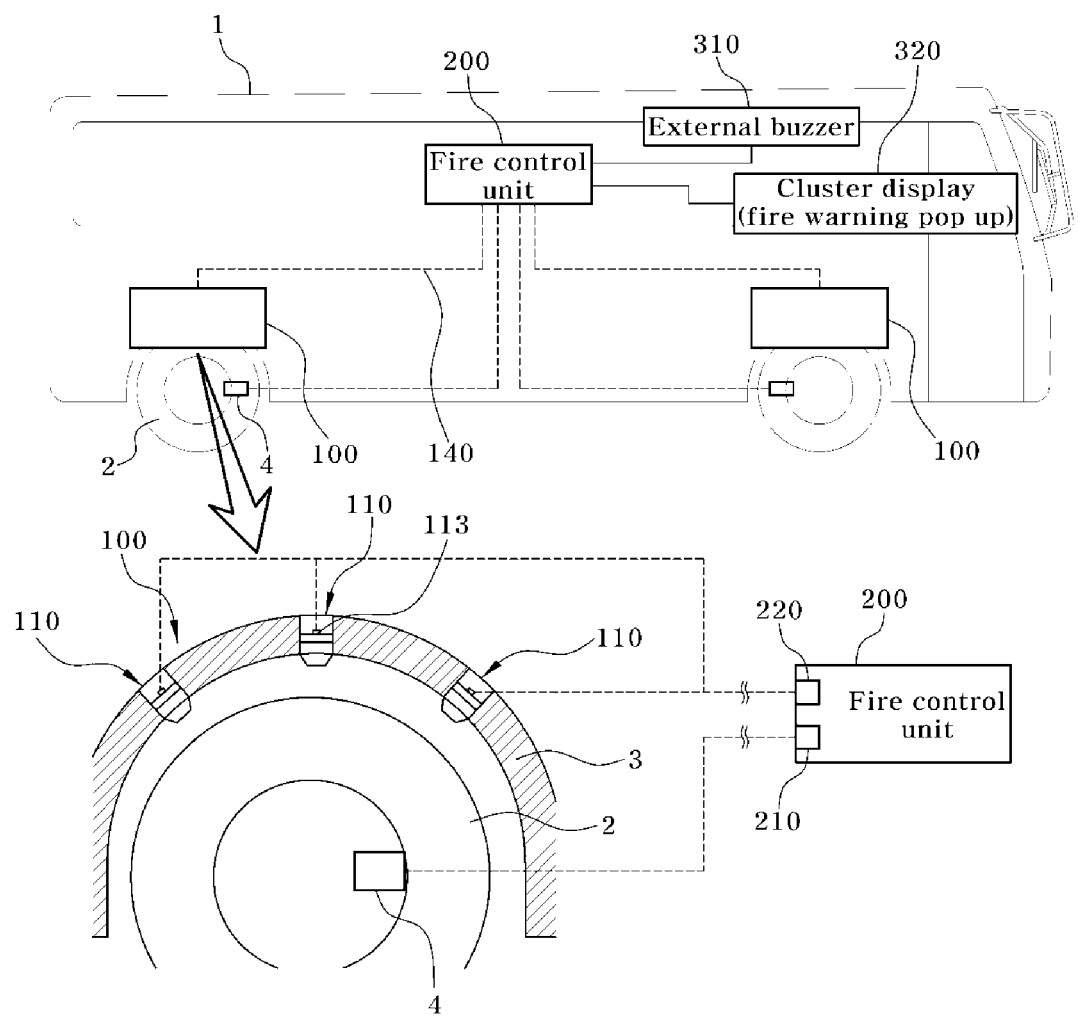
FIG. 1 is a view illustrating an arrangement of a fire extinguishing system for a tire according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, exemplary embodiments of the present disclosure will be described in detail with reference to the accompanying drawings so that those skilled in the art to which the present disclosure pertains may easily implement. However, the present disclosure may be embodied in different forms and should not be limited to the embodiments set forth herein.

The present disclosure relates to a fire extinguishing system for a vehicle and relates to a fire extinguishing system for a tire capable of automatically detecting and extinguishing a fire occurring in the tire (or multiple tires) of the vehicle.

In particular, the present disclosure is to provide a fire extinguishing system capable of automatically spraying fire extinguishing agent selectively only for the tire where the fire has occurred after detecting the fire, thereby performing effective extinguishing of the fire.

The present disclosure is to provide a fire extinguishing system capable of effectively responding to fire for all tire areas of the vehicle and of automatically spraying the fire extinguishing agent selectively only for the tire where the fire has occurred, thereby performing effective extinguishing of the fire.

Figure 2:
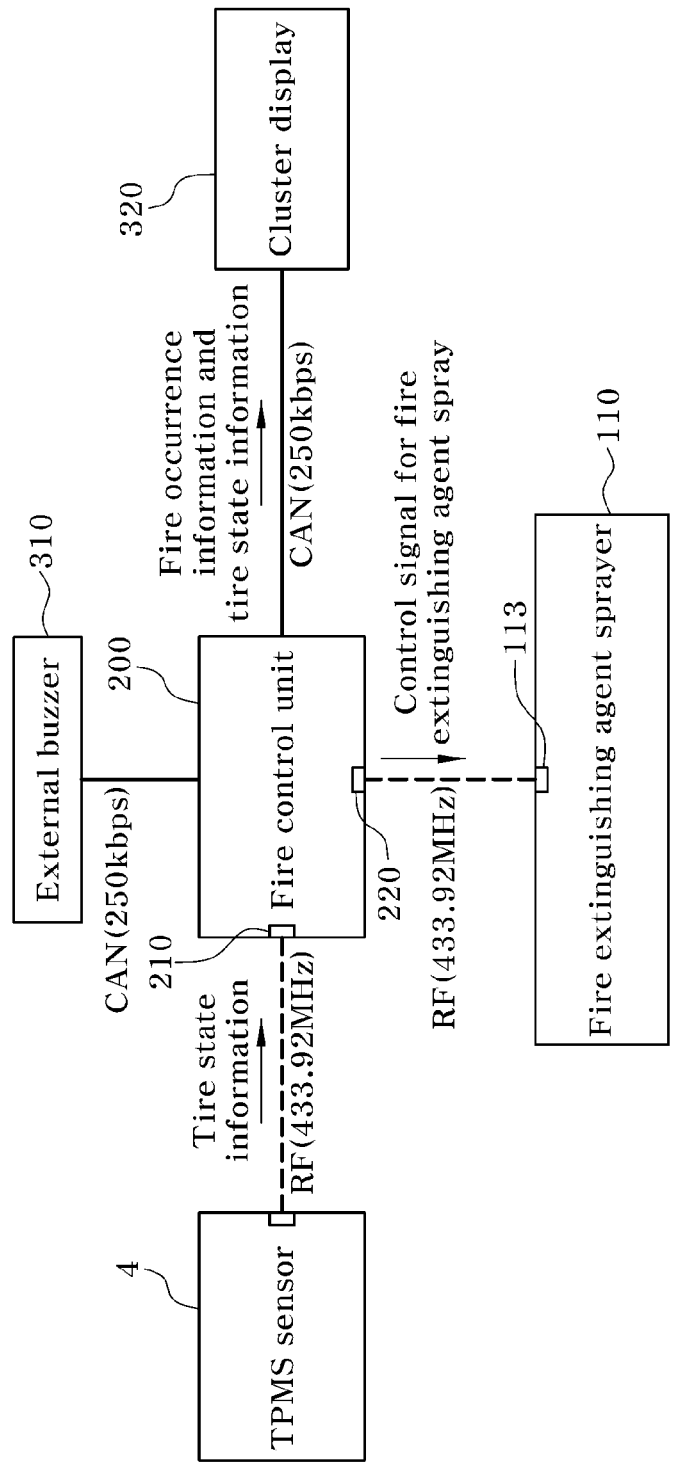
FIG. 2 is a block diagram illustrating an example of a communication connection method between main compositions in the fire extinguishing system for the tire according to the embodiment of the present disclosure.

FIG. 1 is a view illustrating an arrangement of a fire extinguishing system for a tire according to an embodiment of the present disclosure, and FIG. 2 is a block diagram illustrating an example of a communication connection method between main compositions in the fire extinguishing system for the tire according to the embodiment of the present disclosure.

As shown in FIG. 1, the fire extinguishing system for the tire according to the present disclosure is useful in a large vehicle such as a bus, a truck, or the like, and the same configurations may be provided for each area in which a tire 2 is installed in a vehicle 1.

In particular, each configuration of the fire extinguishing system for each tire area may operate individually and independently. For example, a series of operations for detecting a fire and spraying the fire extinguishing agent may be performed independently in each tire area.

In addition, the configuration of the individual fire extinguishing system installed for each tire area, that is, a fire extinguishing unit 100 shown in an enlarged view of the lower side in FIG. 1 is composed to automatically perform a series of processes for detecting a fire and spraying the fire extinguishing agent in the event of a fire.

In the following description, each tire area may refer to an area in the vehicle 1, including an area of the corresponding tire 2 and an area located above the tire. Alternatively, each tire area may broadly refer to an area in the vehicle 1, including an area of the corresponding tire 2 and all of the vehicle body area around a part where the corresponding tire 2 is installed.

In the present disclosure, a fire extinguishing unit 100 that automatically detects a fire and sprays the fire extinguishing agent in the event of the fire may be installed in no less than one area of the four tire areas at the front, rear, left, and right in the vehicle 1.

That is, the fire extinguishing system according to the present disclosure may be installed in all four tire areas in the vehicle 1, but may also be selectively installed in only some predetermined areas of the four tire areas.

Although it has been described above that the vehicle has four tire areas, this is only an example, and the number of tire areas may vary depending on the vehicle model.

The fire extinguishing system according to the embodiment of the present disclosure, as shown in FIG. 1, includes a fire extinguishing agent sprayer 110 mounted to a position where the fire extinguishing agent may be sprayed from the vehicle 1 toward each tire 2, and a fire detection sensor 4 installed in each tire 2.

In the exemplary embodiment of the present disclosure, a plurality of fire extinguishing agent sprayers 110 may be installed to be disposed at a predetermined interval from lower parts of the vehicle 1 to areas above each tire 2, and the one fire detection sensor 4 may be installed for each tire 2.

In the embodiment of the present disclosure, a plurality of fire extinguishing agent sprayers 110 may be installed in a vehicle body part 3 of a lower part of the vehicle 1, for example, in a wheelhouse which is a vehicle body part of an area above the tire 2 and may be installed in the wheelhouse at predetermined intervals in a front-rear direction along the tire 2 below the wheelhouse.

FIG. 1 shows an embodiment in which three fire extinguishing agent sprayers 110 are installed on an area above the tire 2, but the number of the fire extinguishing agent sprayers shown is exemplary, and the present disclosure is not limited thereto. In addition, the number of the fire extinguishing agent sprayers may be variable.

According to the configuration of the illustrated embodiment, when fire occurs in the tire, the tire fire is detected from the signal of the fire detection sensor 4 installed in the tire 2, and in particular, a plurality of fire extinguishing agent sprayers 110 installed above the tire where the fire has occurred may be operated to simultaneously spray the fire extinguishing agent.

In the embodiment of the present disclosure, the fire detection sensor 4 may be a sensor that senses a temperature of the tire 2. In addition, as the fire detection sensor 4, a known tire pressure monitoring system (TPMS) sensor which measures the temperature together with air pressure of the tire 2 and transmits a radio signal corresponding to the measured value, may be used.

As is known, in the vehicle, it is very important to maintain the air pressure of the tire in a proper state, and to this end, there has been disclosed the TPMS that measures the tire state such as the air pressure, temperature, and the like of the tire through the TPMS sensor attached to the tire and notifies information of the measured tire state to a driver by displaying through a cluster of the vehicle.

Such a TPMS includes the TPMS sensor that is individually installed on each tire of the vehicle to measure the air pressure and temperature of the tire, wherein the TPMS sensor functions to modulate the information of the tire state such as the air pressure, temperature, and the like of the tire to a radio frequency (RF) signal and to transmit the signal.

As described above, the tire fire extinguishing system according to the present disclosure includes the fire detection sensor 4, which is installed for each tire 2 of the vehicle, to detect fire for each tire, wherein a sensor that measures the temperature of the tire may be used as the fire detection sensor 4.

An existing TPMS sensor mounted in each tire 2 of the vehicle may be used as a fire detection sensor 4, and a fire control unit (FCU) 200 receives an RF signal from the TPMS sensor 4 of each tire 2, thereby determining the fire occurrence for each tire.

When the tire 2 fire is detected from the signal of the fire detection sensor 4, the entire fire extinguishing agent sprayers 110 installed in the corresponding tire area are operated at the same time, and in particular, the fire extinguishing agent is evenly sprayed from the entire fire extinguishing agent sprayers 110 toward the tire 2 that is located below the fire extinguishing agent sprayers, whereby initial fire extinguishing may be achieved for sure.

In the embodiment of the present disclosure, the FCU 200 determines the state of the tire 2 on the basis of a signal received from each fire detection sensor 4, and in particular, the occurrence of the tire fire is determined from the temperature information of the tire 2.

In the embodiment of the present disclosure, the FCU 200 includes an RF receiver 210 for receiving the RF signal transmitted from the fire detection sensor 4, that is, the TPMS sensor installed in each tire 2.

Accordingly, when the TPMS sensor 4 attached to each tire 2 modulates tire state information such as air pressure, temperature, and the like measured at the corresponding tire to the RF signal and transmits the RF signal, the FCU 200 receives the RF signal through the RF receiver 210 embedded therein, thereby monitoring the state of each tire 2.

The FCU 200 may receive the RF signal from the TPMS sensor 4 installed in each tire 2 and determine whether a fire of the corresponding tire has occurred from the temperature of the tire that the received RF signal indicates.

A typical range of the temperature of the tire is −40° C. to 125° C., and in the present disclosure, when the temperature of the tire 2 measured by the TPMS sensor 4, that is, when the temperature of the tire that the RF signal of the TPMS sensor 4 indicates is no less than a preset reference temperature for deciding a fire, the FCU 200 may determine that the fire has occurred at the tire.

For example, when the temperature of the tire 2 measured by the TPMS sensor 4 is no less than the reference temperature of 180° C., the FCU 200 may determine that a fire has occurred in the tire 2 at which the TPMS sensor 4 is installed.

In particular, a measurement temperature of 180° C. is a temperature that is not be able to appear unless it is due to fire. As the temperature of the tire is not be able to rise to 180° C. in unfavorable states other than the fire, the reference temperature (i.e. the preset reference temperature) for decision may be set as 180° C.

Subsequently, when it is determined the tire 2 has a fire, the FCU 200 operates the notification devices 310 and 320 notifying the tire fire.

In the embodiment of the present disclosure, the notification device may be at least one of a sound output device 310, a display device 320, and a lamp (not shown) that operate to notify fire occurrence according to a control signal the FCU 200 outputs, where the FCU 200 is installed in the vehicle 1.

Here, the sound output device 310 may be a buzzer installed in the interior or exterior of the vehicle 1, the display device 320 may be a display installed in the cluster or another in-vehicle display (e.g. AVN display), and the lamp may be a warning lamp installed in the cluster or in the interior or exterior of the vehicle 1.

For example, the FCU 200 may allow fire occurrence information including the location of the tire where the fire has occurred to be displayed through the display.

In addition, the FCU 200 may be a controller in which the functions of the TPMS ECU are integrated. In this case, the FCU 200 together with a known TPMS ECU receives an RF signal from the TPMS sensor 4 and may allow the tire state information such as the air pressure, temperature, and the like of the tire obtained from the RF signal to be displayed through the display in the cluster which is the display device 320.

In addition, in the embodiment of the present disclosure, the FCU 200 may be provided to transmit a control signal for spraying the fire extinguishing agent only to the fire extinguishing agent sprayers 110 on the tire 2 side where the fire has occurred when detected a fire has occurred in an arbitrary tire.

The FCU 200 may be provided to modulate the control signal, for spraying the fire extinguishing agent, to the RF signal which is a wireless signal and transmits the RF signal. To this end, the FCU 200 may be provided with an RF transmitter 220 configured to modulate the control signal to the RF signal and then transmit the RF signal.

In addition, each fire extinguishing agent sprayer 110 is provided with an RF receiver 113 capable of receiving the control signal, that is, the RF signal, output from the FCU 200 through the RF transmitter 220.

As such, an RF signal (for example, an RF signal having a frequency of 433.92 MHz) may be transmitted and received between each fire detection sensor (TPMS sensor) 4 and the FCU 200 as in the TPMS. In addition, the RF signal (for example, the RF signal having the frequency of 433.92 MHz) may be transmitted and received even between the FCU 200 and each fire extinguishing agent sprayer 110.

With reference to FIG. 2, it may be seen that RF communication is established between the TPMS sensor 4 and the FCU 200 and between the FCU 200 and the fire extinguishing agent sprayer 110 for detecting and extinguishing the fire.

The signal required between the FCU 200 and the notification devices 310 and 320 may be transmitted and received through wired communication, for example, vehicle CAN communication (e.g., 250 kbps), as illustrated in FIG. 2.

In an example of FIG. 2, the TPMS sensor 4 installed in each tire 2 converts the tire state information such as the measured air pressure, temperature, and the like of the tire to the RF signal and then transmits the RF signal to the FCU 200, whereby the FCU 200 determines whether a fire has occurred in each tire 2 on the basis of the received tire state information.

The RF signal that the TPMS sensor 4 generates and then transmits to the FCU 200 may be a signal that includes tire information for enabling identification of the measured tire, together with the measured tire state information.

Here, the tire identification information may be information indicating a position (position of the front, rear, left, or right) of a tire in which air pressure and temperature are measured in a vehicle, or may be ID information provided for each TPMS sensor 4.

Accordingly, the FCU 200 may identify the tire 2 for which the air pressure, temperature, and the like are measured from the RF signal, thereby acquiring state information such as air pressure, temperature, and the like for each tire.

In addition, the FCU 200 may determine whether a tire fire has occurred and a tire where the fire has occurred, from the temperature of the tire among tire state information received from the TPMS sensor 4.

In addition, the FCU 200 transmits the acquired tire state information to the cluster by wired communication and further, when it is determined that a fire has occurred in the tire, transmits the fire occurrence information to the cluster by the wired communication.

Hereby, while displaying the state of each tire 2, the cluster display 320 may allow a warning message indicating that a fire has occurred to be displayed when receiving the fire occurrence information.

In addition, when determine that a fire has occurred, the FCU 200 transmits RF signals for the fire extinguishing agent sprayers 110 installed on the side of the tire where the fire has occurred. That is, the FCU 200 transmits control signals, for spray operations of the fire extinguishing agent of the fire extinguishing agent sprayers 110 installed on the side of the tire where the fire has occurred, in the RF signals.

Accordingly, each fire extinguishing agent sprayer 110 on the tire side where the fire has occurred performs a spray operation for spraying the fire extinguishing agent according to the control signal transmitted thereto.

In the embodiment of the present disclosure, since a plurality of the fire extinguishing agent sprayers 110 is installed for each tire 2 of the vehicle 1, the FCU 200 transmits the control signal (RF signal) at the same time to all the fire extinguishing agent sprayers on the tire side where the fire has occurred.

As a result, all of the fire extinguishing agent sprayers 110 on the tire side where a fire has occurred simultaneously perform the spray operation.

When a wired data transmission and reception method is applied using a general wire rather than an RF wireless transmission and reception method in order to transmit a signal between the FCU 200 and each fire extinguishing agent sprayer 110, the wire length increases due to the nature of the bus layout (full length of 11.8 m to 12.5 m), whereby the wired data transmission and reception method may be vulnerable to noise.

In addition, when wires are wired all between the FCU 200 and each of the fire extinguishing agent sprayers 110, there is a problem of weight increase due to excessive use of wires, and due to the characteristics of the vehicle package, there are many difficulties in wiring the wires from the FCU 200 to each tire 2.

However, because the RF wireless communication instead of wired communication by wiring is used in the present disclosure, problems such as noise and weight increase and the like may be solved.

In addition, a method of using a fire detection line for detecting a fire is known. In the method of using the fire detection line, a fire detection line is provided around the tire, and when the covering material (PVC) of the fire detection line touches a flame and melts, the conductor inside the coating material is short-circuited to detect fire. However, in this case, even when the covering material of the fire detection line is damaged due to a cause other than the fire, it may be detected as the fire has occurred, and a fire extinguishing agent may be unnecessarily sprayed.

On the other hand, when the signal of the existing TPMS sensor 4 mounted on each tire 2 is used in order to detect the occurrence of the fire in the tire as in the present disclosure, it may prevent malfunction such as unnecessary fire extinguishing agent spraying that may occur when the fire detection line is used.

That is, it is possible to accurately spray the fire extinguishing agent only in a fire situation, thereby expecting an effect of improving the operating reliability of the system.

In addition, in the fire extinguishing system according to the present disclosure, the fire extinguishing agent may be sprayed only for a tire where the fire has occurred by operating the fire extinguishing agent sprayer, thereby enabling efficient fire extinguishing. In addition, in the fire extinguishing system according to the present disclosure, the extinguishing agent may be sprayed by operating an extinguishing agent injector only for the tire where the fire has occurred, thereby enabling efficient fire extinguishing.

Meanwhile, in the embodiment of the present disclosure, the fire extinguishing agent sprayer 110 may be configured to a spray powder fire extinguishing agent.

To this end, the fire extinguishing agent sprayer 110 installed for each tire 2 of the vehicle 1 may individually include a small fire extinguishing agent tank (referred to as a reference numeral '114' in FIG. 5) in which the powder fire extinguishing agent is filled.

As such, when a plurality of the fire extinguishing agent sprayers 110 installed for each tire 2 of the vehicle 1 is configured to be individually provided with the fire extinguishing agent tank and to separately spray the fire extinguishing agent stored in the fire extinguishing agent tank, complicated piping such as fire extinguishing agent supply hoses or spray lines connecting the areas between the front, rear, left, and right tires are not needed.

In addition, in the case of the conventional fire extinguishing system, as a centralized system sharing a nitrogen tank and cylinder, it is impossible for the conventional fire extinguishing system to respond to fires in a plurality of tire areas separated by along distance.

In particular, when the centralized fire extinguishing system is applied in a commercial vehicle such as a large bus, truck, or the like, since the distance between a tire and another tire is long, the spray line may be lengthened, whereby the spray pressure and spray force may decrease, whereby the fire extinguishing through the spray of the fire extinguishing agent is not possible.

In addition, when the conventional centralized system is applied, even though a fire occurs only in one tire, the fire extinguishing agent is sprayed in all of the four tire areas, so that it may not only be inefficient but also incur excessive A/S costs.

On the other hand, the fire extinguishing system according to the present disclosure is advantageous in terms of an A/S since the fire is extinguished by spraying the fire extinguishing agent only to the tire where the fire has actually occurred and is advantageous in terms of mount ability since the fire extinguishing agent sprayer individually has an integral configuration including both of a nozzle (which is a spray hole to be described later) and a tank, and is compact.

In the meanwhile, with reference to the drawings will be described in more detail for the individual configuration of the fire suppression system according to an embodiment of the present disclosure.

Figure 3:
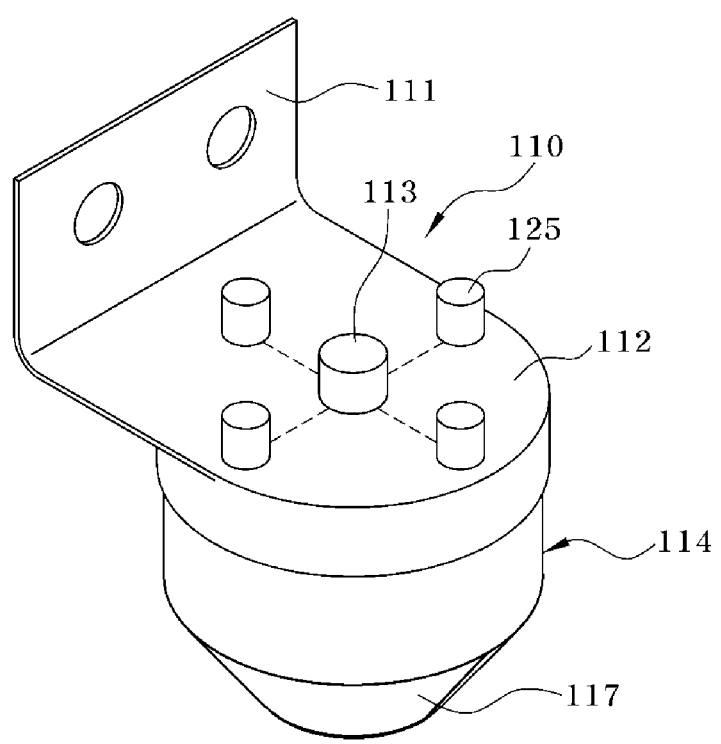
FIGS. 3 and 4 are perspective views, respectively, illustrating a fire extinguishing agent sprayer in the fire extinguishing system according to the embodiment of the present disclosure.
Figure 4:
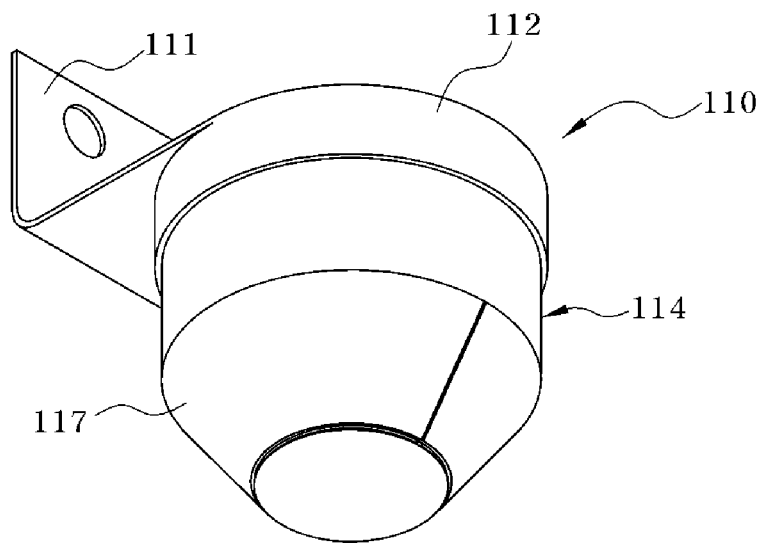

FIGS. 3 and 4 are perspective views, respectively, illustrating the fire extinguishing agent sprayer in the fire extinguishing system according to the embodiment of the present disclosure, wherein FIG. 3 is a top plan perspective view, and FIG. 4 is a bottom plan perspective view.

Figure 5:
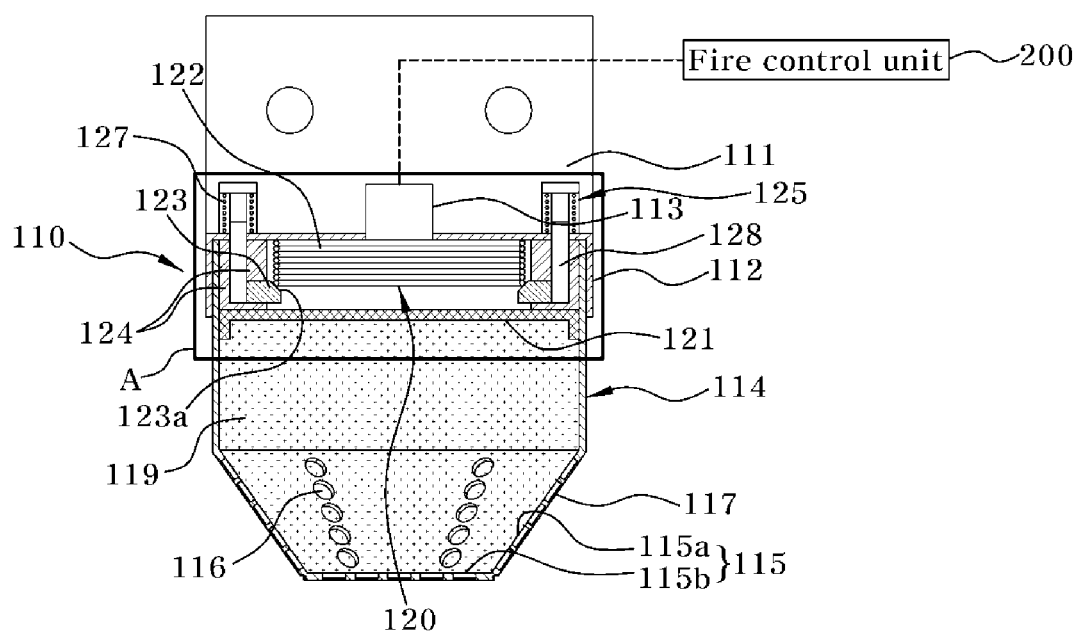
FIG. 5 is a sectional view illustrating the fire extinguishing agent sprayer in the fire extinguishing system according to the embodiment of the present disclosure.
Figure 6:
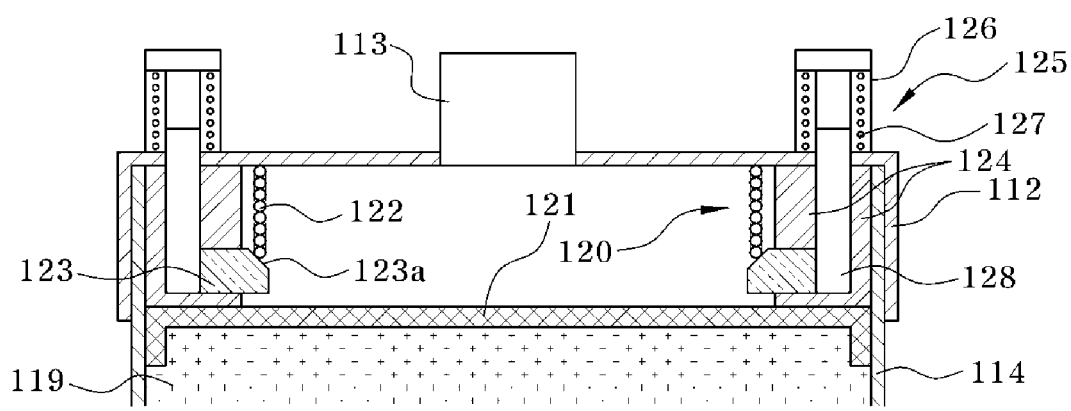
FIGS. 6 and 7 are sectional views illustrating the operating states, respectively, of the pressure generator in the fire extinguishing agent sprayer in the fire extinguishing system according to the embodiment of the present disclosure.
Figure 7:
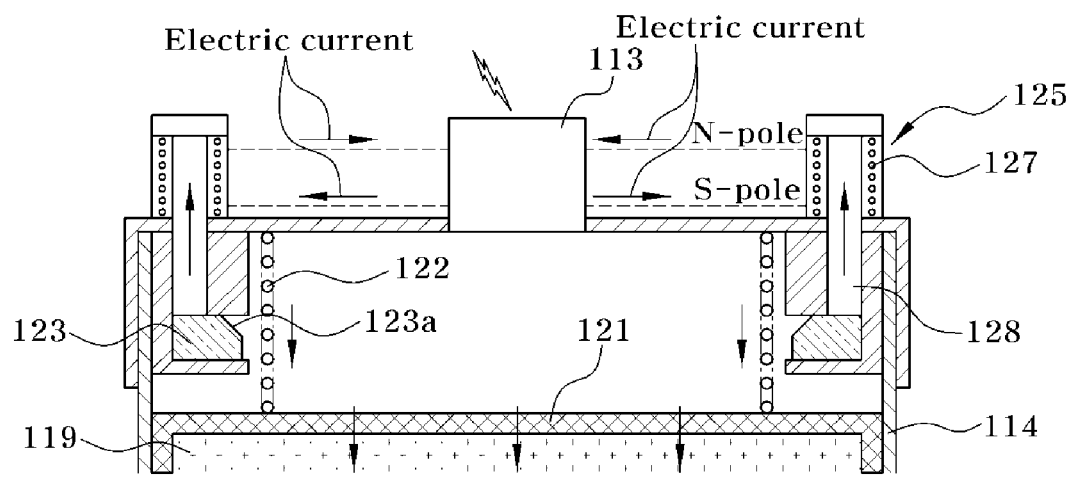

In addition, FIG. 5 is a sectional view illustrating the fire extinguishing agent sprayer in the fire extinguishing system according to the embodiment of the present disclosure, and FIGS. 6 and 7 are sectional views illustrating the operating states, respectively, of the pressure generator in the fire extinguishing agent sprayer in the fire extinguishing system according to the embodiment of the present disclosure and are enlarged sectional views, respectively, of the square portion of FIG. 5.

Figure 8:
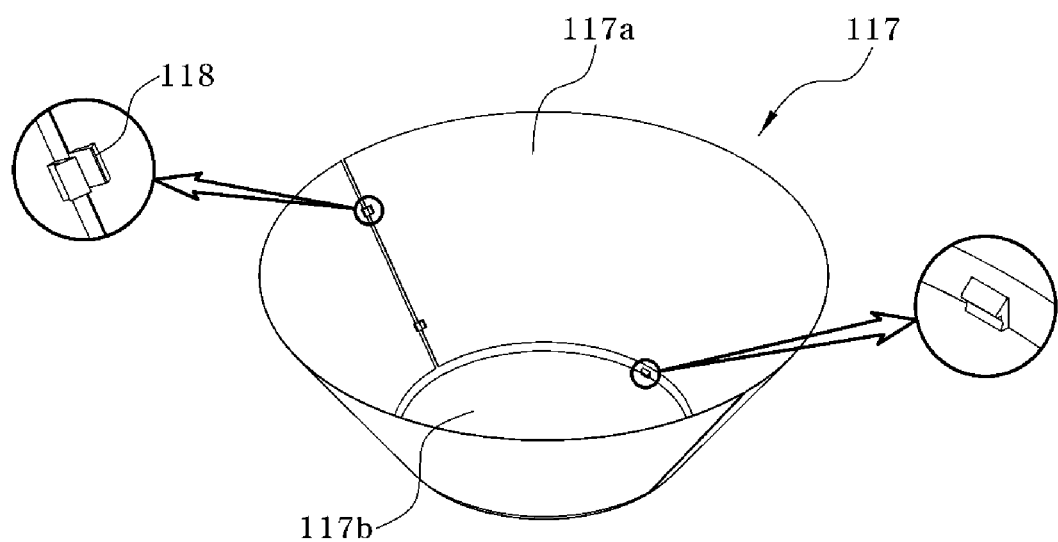
FIG. 8 is a perspective view illustrating a cover of the fire extinguishing agent sprayer in the fire extinguishing system according to the embodiment of the present disclosure.
Figure 9:
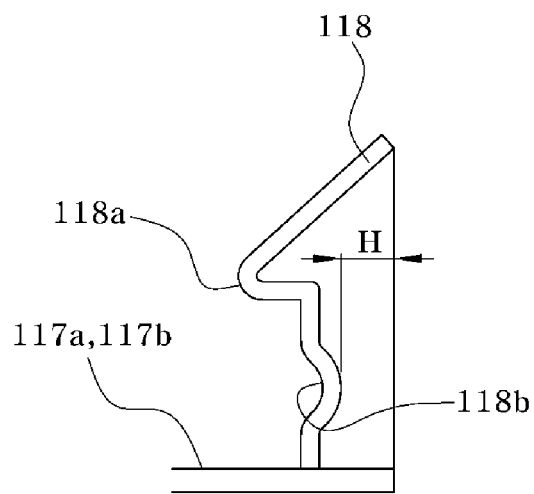
FIG. 9 is a view illustrating a shape of a hook provided in the cover of the fire extinguishing agent sprayer in the fire extinguishing system according to the embodiment of the present disclosure.

In addition, FIG. 8 is a perspective view illustrating a cover of the fire extinguishing agent sprayer in the fire extinguishing system according to the embodiment of the present disclosure, and FIG. 9 is a view illustrating a shape of a hook provided in the cover of the fire extinguishing agent sprayer in the fire extinguishing system according to the embodiment of the present disclosure.

Description thereof will be provided with reference to FIGS. 1 and 2 together.

As shown in FIGS. 1 and 2, in the embodiment of the present disclosure, the fire extinguishing agent sprayer 110 has an integral tank configuration in which the fire extinguishing agent 119 is filled and includes a bracket 111, a cap 112, an RF receiver 113, a fire extinguishing agent tank 114, a cover 117, and a pressure generator 120.

First, the bracket 111 is provided for mounting the fire extinguishing agent sprayer 110 to the vehicle body and is provided to be fixed to the vehicle body part 3, for example, wheelhouse located above the tire 2, of the lower part of the vehicle.

In particular, the bracket 111 may be fixed by welding to the vehicle body part 3 or by fastening to the vehicle body part using fastening means such as a bolt and nut, or a screw, fastener, or the like when welding is impossible for the vehicle body part.

In the embodiment of the present disclosure, the cap 112 is integrally connected to the bracket 111, and the RF receiver 113 for receiving an RF signal from the FCU 200 is fixedly installed on the cap 112.

As described above, the FCU 200 transmits a control signal in an RF signal only to the fire extinguishing agent sprayers 110 on the tire side where the fire has occurred, thereby allowing the fire extinguishing agent to be selectively injected, and each fire extinguishing agent sprayer 110 receives the RF signal transmitted from the FCU 200 through the RF receiver 113.

In the embodiment of the present disclosure, the RF receiver 113 may be fixedly installed on a top surface of the cap 112 as illustrated in FIG. 3.

In addition, the fire extinguishing agent tank 114 is coupled to a position under the cap 112, wherein the upper portion of the fire extinguishing agent tank 114 may be inserted into the inside of the cap 112 to be coupled.

In particular, the fire extinguishing agent tank 114 may be detachably coupled to the cap 112, and to this end, the cap 112 and the fire extinguishing agent tank 114 may be coupled to each other by a screw fastening method.

That is, the upper portion of the fire extinguishing agent tank 114 is inserted into the inside of the cap 112 to be screw-coupled, and threads are processed for screw-coupling on the upper outer circumferential surface of the fire extinguishing agent tank 114 and the inner circumferential surface of the cap 112.

As such, the cap 112 and the fire extinguishing agent tank 114 are provided to be coupled in a screw-fastening manner, whereby the fire extinguishing agent tank 114 may be easily separated from the cap 112 as necessary when the fire extinguishing agent 119 is refilled into the fire extinguishing agent tank 114 after the spray operation, or the A/S is performed.

The cap 112 serves to seal the top portion of the fire extinguishing agent tank 114, and the pressure generator 120 is installed inside the cap 112, wherein the pressure generator is configured to generate the spray pressure according to the control signal received from the FCU 200 through the RF receiver 113 and to act the pressure on the fire extinguishing agent 119 inside the tank.

In the embodiment of the present disclosure, the pressure generator 120 may be installed a space defined at an inner side between the cap and the top portion of the fire extinguishing agent tank coupled thereto.

In the embodiment of the present disclosure, the pressure generator 120, which may be configured to generate and provide high-pressure spray pressure using the force of the spring 122, may include: a pressure plate 121 installed on a top side of the fire extinguishing agent 119 filled inside the fire extinguishing agent tank 114; a spring 122 installed in a space defined between the cap 112 and the pressure plate 121; a stopper 123 fixing the spring 122 in a compressed state; and an actuator 125 operating the stopper 123 to release the fixing of the spring 122 by the control signal received through the RF receiver 113.

The pressure plate 121 is installed to be substantially horizontally disposed inside the upper portion of the fire extinguishing agent tank 114 so as to cover the fire extinguishing agent (e.g., powder fire extinguishing agent) 119 filled in the inside of the fire extinguishing agent tank 114 from the top side and is installed to be movable in a downward direction at the inner side of the upper side of the fire extinguishing agent tank 114.

As such, the pressure plate 121 is configured to be installed to be movable in the downward direction at the top side of the fire extinguishing agent 119 and to generate spray pressure, which acts toward a direction to push out the fire extinguishing agent, on the fire extinguishing agent. The spring 122 is configured to provide elastic restoring force for generating the spray pressure on the fire extinguishing agent 119 by moving the pressure plate 121 in the downward direction inside the fire extinguishing agent tank 114.

In the embodiment of the present disclosure, a plurality of actuators 125 and the same number of stoppers 123 may be installed at equal intervals along the circumferential direction of the cap 112, wherein the actuator 125 is fixedly installed at the cap 112, and the stopper 123 is installed, to be slidingly movable in a radial direction of the cap 112 and the pressure plate 121, at the retainer 124.

With reference to FIG. 3, it may be seen that a total of four actuators 125, disposed at intervals of a 90° angle along the circumferential direction on the cap 112, are installed. In this case, since a stopper (referred to as a reference numeral '123' in FIG. 5) is installed for a position of each actuator 125, a total of four stoppers 123 are also installed at intervals of a 90° angle.

Each stopper 123 is installed to support the spring 122 in a compressed state on a position above the pressure plate 121, wherein the spring 122 is located in a space defined between the cap 112 and the pressure plate 121 in a compressed state and, in particular, between the inner surface of the cap 112 and the inclined surface 123a of the stopper 123.

Each stopper 123 is supported by the actuator 125 so as to be prohibited to move in a rearward direction while supporting the spring 122, that is, so as to be prohibited to move toward an outer side in the radial direction of the extinguishing agent sprayer (radial direction of the pressure plate). In particular, depending on the state of the actuator 125, each stopper 123 may be in a fixed state (locked state) in which rearward movement is prohibited or in an unfixed state (unlocked state) in which rearward movement is allowed.

In an exemplary embodiment, a ring-shaped retainer 124 may be installed on the pressure plate 121, and each stopper 123 may be coupled to holes (not shown) of the retainer 124 in order to be guided to the rear movement for releasing each spring.

In addition, an inclined surface 123a is provided at an upper portion of a front end of each stopper 123, and a lower end of the spring 122 is supported on the inclined surface 123a.

When the spring 122 in the compressed state is supported on the inclined surface 123a of each stopper 123, provided the fixed state (locked state) of the stopper 123 held by the actuator 125 is released, that is, when the stopper 123 is put in a state allowed to move rearward, the stopper 123 is pushed out to a rear side by the strong elastic restoring force of the spring 122 being restored (i.e., expanded and deployed) by elasticity, thereby being moved.

In particular, the spring 122 strongly pushes out the pressure plate 121 by being expanded and deployed in the downward direction while being elastically restored, and in the end, the pressure plate 121 pressurizes the fire extinguishing agent 119 filled in the fire extinguishing agent tank 114 at high pressure, and the pressure acts as the spray pressure for spraying the extinguishing agent 119.

Each actuator 125 is a solenoid-operated actuator and has a solenoid 127 that is driven by electric current being applied thereto by the RF receiver 113 that has received a control signal for spraying the fire extinguishing agent from the FCU 200.

That is, each actuator 125 includes: an actuator body 126 fixedly installed to the cap 112; a solenoid 127 driven by the electric current applied thereto by the RF receiver 113 by being installed in the actuator body 126; and an actuation rod 128 coupled to the actuator body 126 to be movable back and forth, thereby moving in a direction to unfix (lock release) the stopper 123 by driving of the solenoid 127.

In each actuator 125, the actuation rod 128 is installed to be movable back and forth in an inner space of the actuator body 126, and the solenoid 127 may be laid on the actuator body 126 so as to be positioned around the actuation rod 128.

Each solenoid 127 of the actuator 125 is electrically connected to the RF receiver 113 through conducting wires, and when a control signal for spraying the fire extinguishing agent is received by the RF receiver 113, by the RF receiver 113 having received the control signal, the driving electric current is applied to the solenoid 127 through the conducting wires.

When an electric current is applied to the solenoid 127, a magnetic field is generated in the surroundings, and the actuation rod 128 supporting the stopper 123 is pulled upward and moved by the magnetic field of the solenoid 127, and eventually the stopper 123 may be moved backward by the force the spring 122 pushes out.

FIG. 6 a view illustrating a fixed state (locked state) in which the spring 122 is fixed in a compressed state by the stopper 123, and the illustrated state is a normal state in which no fire has occurred.

As shown in FIG. 6, the actuation rod 128 of the actuator 125 is located at the rear of each stopper 123 to support the stopper 123, wherein the actuation rod 128, located on the bottom of the retainer by its own weight, prevents the stopper 123 from moving rearward, whereby the spring 122 continues to maintain the compressed state in a state supported by the stopper 123.

In particular, the spring 122 is supported by putting the lower end thereof on the inclined surface 123a provided on the upper part of the front surface of the stopper 123 and lies in a state where pressure for spraying the fire extinguishing agent is not generated since there are no expansion and deployment thereof.

FIG. 7 is a view illustrating a state in which the fixed state of the spring 122 held by the stopper 123 is released, whereby a state where the spring 122 is elastically restored is illustrated, and the illustrated state is a state when an extinguishing agent is being sprayed as a fire occurrence is detected.

As described above, the actuator 125 is operated by the RF receiver 113 that receives the control signal from the FCU 200, and an electric current is applied to the solenoid 127, whereby the actuation rod 128, which has supported the stopper 123 from the rear, is pulled upward and moved.

Accordingly, as the elastic restoring force of the spring 122 to be expanded and deployed acts on the inclined surface 123a of the stopper 123, the stopper 123 is pushed out in a rearward direction and moved, and then the spring 122 expands and deploys, in the downward direction, thereby strongly pushing out the pressure plate 121 in the downward direction.

As the force that the spring 122 expands and deploys in the downward direction strongly pushes the pressure plate 121 in the downward direction, the pressure plate 121 pressurizes the fire extinguishing agent 119 in the fire extinguishing agent tank 114, and the fire extinguishing agent 119 may be sprayed from the fire extinguishing agent tank 114.

As such, in the pressure generator 120, the spray pressure is generated while fixing of the spring 122 is released by the actuator 125, and by the force the spring 122 pushes out the pressure plate 121 while the spring 122 is expanded and deployed by being elastically restored, the spray pressure for pressurizing and spraying the fire extinguishing agent 119 may be generated.

In the embodiment of the present disclosure, among the components of the fire extinguishing agent injector 110, the fire extinguishing agent tank 114 is manufactured in a container shape having an internal space, and the powder fire extinguishing agent 119 is filled in the inside of the fire extinguishing agent tank 114, wherein the filled powder fire extinguishing agent 119 is located below the pressure generator 120.

The fire extinguishing agent tank 114 has an inner space sealed by the cap 112 coupled to a top portion thereof and is provided in a tank bottom part 115 with spray holes 116 which may discharge and spray the fire extinguishing agent 119 filled in the fire extinguishing agent tank.

In an exemplary embodiment of the present disclosure, the tank bottom part 115 may be configured in a truncated cone-shaped container shape, that is, a truncated circular cone shaped container shape, and a plurality of spray holes 116 through which the fire extinguishing agent 119 is sprayed may be provided at the tank bottom part of the fire extinguishing agent tank 114 having such a truncated circular cone shaped container shape.

As shown in FIG. 5, the plurality of spray holes 116 in the tank bottom part 115 may be provided in both a side surface portion 115a which is an inclined surface portion in cross section in the truncated circular cone shaped container shape and a bottom surface portion 115b which is the bottom surface portion of the truncated circular cone shaped container shape.

In addition, the plurality of spray holes 116 may be provided at predetermined intervals along the circumferential direction in the tank bottom part 115, wherein the plurality of spray holes 116 may be provided to form rows at the side surface portion 115a and the bottom surface portion 115b of the tank bottom part 115.

For example, the plurality of the spray holes 116 may be provided to form rows in a straight line throughout the side surface portion 115a and the bottom surface portion 115b of the tank bottom part 115, and a plurality of arrangements of the spray holes 116 forming the straight line as above may be provided at predetermined intervals along the circumferential direction of the tank bottom part 115.

As described above, since the tank bottom part 115, which is the portion where the fire extinguishing agent 119 is sprayed from the fire extinguishing agent sprayer 110, has the truncated circular cone shape, the fire extinguishing agent 119 may be sprayed in all directions on the lower side through the plurality of the spray holes 116 provided in the tank bottom part 115.

That is, during the fire extinguishing agent 119 is sprayed in the downward direction toward the tire 2 through the plurality of spray holes 116 provided in the tank bottom part 115 of the truncated circular cone shaped tank, the fire extinguishing agent may be widely spread throughout the entire circumference, thereby spraying in the downward direction.

In addition, by the plurality of the spray holes 116 arranged as above in the tank bottom part 115 of the truncated circular cone shape, the sprayed fire extinguishing agent 119 may be evenly distributed in the downward direction toward the wide area of the tire 2.

In addition, in the tank bottom part 115 where the spray holes 116 are provided, a cover 117 sealing the holes 116 in the tank bottom part 115 may be mounted so that the fire extinguishing agent 119 filled inside the fire extinguishing agent tank 114 is not discharged through the spray holes 116 in normal times.

The cover 117 in a state of being installed is fixed to the tank bottom part 115 so as to normally seal the spray holes 116.

On the other hand, in times of spraying, when the fire extinguishing agent 119 is pressurized by the pressure generated by the pressure generator 120, the pressure (spray pressure) of the fire extinguishing agent 119 acting through the spray holes 116 pushes out the cover 117. In this case, the cover 117 is separated and removed from the tank bottom part 115.

That is, the cover 117 maintains an inner space of the tank bottom part 115 to be sealed by blocking the spray holes 116 in normal times. When the pressure of the fire extinguishing agent 119, to be ejected through the spray holes 116, largely acts on the cover 117 with a force no less than a preset level, the cover 117 fixed to the tank bottom part 115 is separated and detached, thereby opening the spray holes 116, whereby the fire extinguishing agent 119 may be ejected and sprayed at high pressure through the spray holes 116.

In an exemplary embodiment, the cover 117 is configured in a shape that may be brought into close contact with the entire outer surface of the tank bottom part 115, where the spray holes 116 are provided. That is, the cover 117 is configured in a shape that may be brought into close contact with both the side surface portion 115a and the bottom surface portion 115b of the tank bottom part 115 having a truncated cone shape.

In addition, in the exemplary embodiment, the cover 117 may be composed of a plurality of separate cover members 117a and 117b, wherein each of the cover members 117a and 117b is installed to maintain a state of being in close contact with the tank bottom part 115 at a predetermined position.

In particular, the cover 117 may include a plurality of side surface cover members 117a coupled to be brought into close contact with the side surface portion 115a of the tank bottom part 115 and a bottom surface cover member 117b in a circular shape coupled to be brought into close contact with the bottom surface portion 115b of the tank bottom part 115.

As such, the plurality of the cover members 117a and 117b are installed to be brought into close contact with the outer surface of the tank bottom part 115, whereby the cover 117 that seals the spray holes 116 of the tank bottom part 115 may be configured, and a hook fastening structure is applied between each of the cover members 117a and 117b and the fire extinguishing agent tank 114 for mutual coupling and fixing.

That is, hooks 118 are integrally protrudingly provided at a plurality of positions on each of the cover members 117a and 117b, and the outer surface of the tank bottom part 115 is provided, at the position corresponding to each hook, with latching steps (not shown) to each of which a latching end 18a of each hook 118 may be latched.

In the embodiment of the present disclosure, the latching step may be provided by forming a groove on the outer surface of the tank bottom part 115, wherein the latching end 118a of the latching step 118 may be latched on the groove.

In addition, each of the hooks 118 of the cover members 117a and 117b is configured to maintain fastening force in normal times in a state of being latched on a corresponding locking groove of the fire extinguishing agent tank 114. When the pressure generator 120 operates, each hook is released from the state of being latched on the latching groove by the pressure of the fire extinguishing agent 119, wherein the pressure acts on the hook through the spray holes 116.

To this end, each hook 118 provided in the cover members 117a and 117b may be provided with a fracture portion 118b having a recessed shape to reduce the thickness H in the middle of the hook length.

The fracture portion 118b of each hook 118 is a part weaker than other parts thereof so as to be allowed to be broken by force induced by the pressure no less than a predetermined level acting on the cover members 117a and 117b.

For example, when the spray pressure of the fire extinguishing agent of no less than 20 bar is provided to be inside the fire extinguishing agent tank 114 after an occurrence of fire and then acts on the cover 117 composed of the cover members 117a and 117b, the fracture portion 118b of the hook 118 is fractured. Accordingly, the fastening state of the cover members 117a and 117b is released by the hook, and eventually the spray holes 116 are opened as the cover 117 is automatically removed from the tank bottom part 115.

As such, provided the cover 117 is allowed to be separated when the pressure of the fire extinguishing agent 119 at the inside of the fire extinguishing agent tank 114 reaches a pressure of no less than 20 bar, the powder fire extinguishing agent 119 may be evenly sprayed through the spray holes 116.

In the present disclosure, each of the cover members 117a and 117b may be made of a plastic material, and an inner surface of each of the cover members 117a and 117b may be coupled with an insulator (not shown) so as to be laminated.

The insulator may be made of a rubber or silicone material, which is to allow the cover members 117a and 117b to be completely brought into close contact with the outer surface of the tank bottom part 115, so that the external spill of the fire extinguishing agent and any inflow of moisture and foreign substances into the fire extinguishing agent tank 114 may be prevented.

Figure 10:
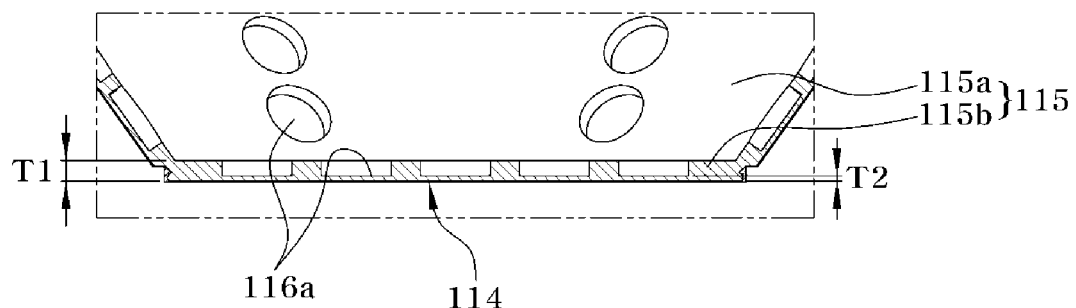
FIG. 10 is a sectional view illustrating a tank bottom part of the fire extinguishing agent sprayer in the fire extinguishing system according to another embodiment of the present disclosure.

On the other hand, FIG. 10 is a sectional view illustrating a tank bottom part of the fire extinguishing agent sprayer in the fire extinguishing system according to another embodiment of the present disclosure, and as shown, the location of spray holes 116 in a side surface portion 115a and bottom surface portion of a tank bottom part 115 may be the same as compared to the above-described embodiment.

However, in the present embodiment, the spray hole 116 is not a hole shape completely drilled in the side surface portion 115a and bottom surface portion of the tank bottom part 115, that is, a hole shape configured by passing through the tank wall. In other words, in the present embodiment, the spray hole 116 is a hole shape configured in the form of grooves recessed from the inner surface of each position. Accordingly, the present embodiment is different from the above-described embodiment.

That is, a groove 116a is provided in a portion corresponding to each spray hole 116 on the inner surface of the tank bottom part 115, wherein the fire extinguishing agent tank 114 is made to have the smaller thickness T2 only at each spray hole compared to the thickness T1 of other parts thereof.

Accordingly, when the spray pressure acts on a portion having thin thickness through the fire extinguishing agent 119 inside the fire extinguishing agent tank 114, the spray hole may be formed while the portion having the thin thickness portion is broken.

When the spray pressure and the expansion pressure of the fire extinguishing agent 119 act on the fire extinguishing agent tank when spraying, the tank portion excluding spray hole portions corresponding to the respective spray holes has the thick thickness T1 to withstand pressure, thereby maintaining a shape thereof, but the spray hole portions have the thin thickness T2, thereby providing holes through which the fire extinguishing agent may be sprayed by being broken when the spray pressure is applied thereon.

The tank in which the thickness of each spray hole portion is thin as described above may be easily manufactured by a method of plastic injection molding.

Eventually, until the spray pressure of the fire extinguishing agent 119 is applied to the spray hole portions, the inside of the fire extinguishing agent tank 114 reaches a state of being sealed because the spray holes are in a state of being normally blocked, and a charging state of the fire extinguishing agent 119 in the fire extinguishing agent tank 114 may be maintained.

As a result, in the present embodiment, there is no need for a separate cover for blocking the spray holes as in the above-described embodiment, and there is an advantage that only the fire extinguishing agent tank 114 needs to be replaced when the fire extinguishing agent is refilled for re-use.

In the present embodiment, the tank thickness T1, the thickness T2 of the spray hole portion, and size of the spray hole affect the internal pressure during spraying and thus are necessary to derive and set the optimum values thereof through repeated preceding tests.

The embodiments of the present disclosure have been described in detail above, but the scope of rights of the present disclosure is not limited thereto, and various modifications and improvements of the skilled person in the art using the basic concept of the present disclosure as defined in the following claims are also included in the scope of the present disclosure.

What is claimed is:

1. A fire extinguishing system for a tire of a vehicle, the system comprising:
    a fire detection sensor configured to detect an occurrence of a fire in the tire of the vehicle;
    a fire control unit configured to receive a signal output from the fire detection sensor and to output a control signal for spraying fire extinguishing agent when the fire control unit determines that the fire has occurred; and
    a plurality of fire extinguishing agent sprayers configured to spray the fire extinguishing agent toward the tire where the fire has occurred according to the control signal output by the fire control unit, in a state of being filled with the fire extinguishing agent therein,
    wherein each of the fire extinguishing agent sprayers comprises:
    a pressure generator configured to operate for generating spray pressure according to the control signal output by the fire control unit,
        a fire extinguishing agent tank filled with the fire extinguishing agent therein and provided with a plurality of spray holes through which the fire extinguishing agent is sprayed when the spray pressure generated in the pressure generator acts thereon, and
        a cap configured to seal the fire extinguishing agent tank, and
        wherein the pressure generator comprises:
        a pressure plate installed to be movable in a downward direction on a top side of the fire extinguishing agent inside the fire extinguishing agent tank and configured to act spray pressure on the fire extinguishing agent, as being moved downward;
        a spring installed inside the fire extinguishing agent tank in a compressed state and configured to provide elastic restoring force for acting the spray pressure on the fire extinguishing agent by moving the pressure plate in the downward direction when being elastically restored;
        a stopper configured to support and fix the spring as disposed between the cap and the stopper in a compressed state; and
        an actuator, provided as integrated with the stopper, configured to operate to release the spring by moving the stopper thereby restoring the spring to an original state thereof according to the control signal output by the fire control unit.

2. The system of claim 1, wherein the fire detection sensor is a temperature sensor configured to measure a temperature of the tire, and
    the fire control unit determines that the fire has occurred at the tire when the temperature of the tire, which the signal of the fire detection sensor indicates, is no less than a reference temperature set for determining the fire occurrence.

3. The system of claim 1, wherein the fire detection sensor is a tire pressure monitoring system (TPMS) sensor configured to modulate tire state information to an RF signal and transmit the RF signal, and
    the fire control unit comprises an RF receiver configured to receive the RF signal transmitted by the TPMS sensor.

4. The system of claim 3, wherein the fire control unit determines that the fire has occurred at the tire when the temperature of the tire indicated by the RF signal of the TPMS sensor, is no less than a reference temperature set for determining the fire occurrence.

5. The system of claim 1, wherein the fire control unit comprises an RF transmitter to convert the control signal for spraying fire extinguishing agent to an RF signal which is a wireless signal, thereby transmitting the RF signal, and
    the fire extinguishing agent sprayer comprises an RF receiver for receiving the RF signal transmitted from the RF transmitter of the fire control unit.

6. The system of claim 1, wherein the fire detection sensor and the plurality of the fire extinguishing agent sprayers are installed on a plurality of tires in the vehicle, and
    the fire control unit is configured to output the control signal for spray operation of the fire extinguishing agent of the fire extinguishing agent sprayers at a tire side where the fire has occurred after identification of the tire where the fire has occurred from the received signal of the fire detection sensor.

7. The system of claim 1, wherein each of the fire extinguishing agent sprayers further comprises:
    a bracket to be fixed to a vehicle body part of a side above the tire for mounting to the vehicle body part; and
    a cap configured to seal the fire extinguishing agent tank by being screw-coupled to a top portion of the fire extinguishing agent tank,
    wherein the pressure generator is located in a space defined at an inner side between the cap and the top portion of the fire extinguishing agent tank coupled thereto.

8. The system of claim 1,
    a plurality of actuators and a same number of stoppers are installed at equal intervals along a circumferential direction of the cap, whereby the springs are supported in a compressed state by the stoppers, respectively.

9. The system of claim 8, wherein a retainer is installed at the inner side of an upper portion of the fire extinguishing agent tank, wherein the stopper is coupled to the retainer, thereby being slidingly movable in a radial direction for fixing the spring and releasing the fixing of the spring.

10. The system of claim 8, wherein the actuator comprises:
    an actuator body fixedly installed to the cap;
    a solenoid provided in the actuator body and configured to be driven by electric current being applied thereto, in response to the control signal output by the fire control unit; and
    an actuation rod coupled to the actuator body to be movable back and forth, thereby operating to release the fixing of the spring held by the stopper when the solenoid is driven.

11. The system of claim 10, wherein the actuation rod is located to support the stopper from the rear so that movement of the stopper fixing the spring in a compressed state is prohibited before driving the solenoid, and
    the actuation rod releases a support state for the stopper, when operated by the driving of the solenoid.

12. The system of claim 11, wherein the stopper is provided to support from the bottom the spring, located between the cap and the stopper at an inside of an upper portion of the extinguishing agent tank, and an inclined surface is provided on an upper portion of a front surface of the stopper, and the spring is supported on the inclined surface, so when the support state of the stopper held by the actuation rod is released, the stopper moves in a direction to release the fixing of the spring by the elastic restoring force of the spring.

13. The system of claim 1, wherein a tank bottom part of the fire extinguishing agent tank is configured in a truncated circular cone shape, and the spray holes are provided at a side surface portion and a bottom surface portion in the tank bottom part of the truncated circular cone shape.

14. The system of claim 1, wherein the fire extinguishing agent sprayer further comprises a cover coupled to an outer surface of the fire extinguishing agent tank so as to seal the spray holes, wherein the cover is coupled to be able to be removed from the fire extinguishing agent tank by the spray pressure of the fire extinguishing agent inside the fire extinguishing agent tank acting through the spray holes.

15. The system of claim 14, wherein a plurality of hooks is provided at the cover, whereby the cover is latched on the fire extinguishing agent tank by the hook, and the hook is configured to have a fracture portion provided to be able to be broken when pressure of no less than a predetermined level acts on the cover by the fire extinguishing agent in a state of being latched.

16. The system of claim 1, wherein in the fire extinguishing agent tank, each of the spray holes is configured in a structure being normally blocked, whereby thickness of a spray hole portion corresponding to each spray hole is set to be smaller compared to thickness of remaining parts of the tank, and the spray hole portion is configured such that when the spray pressure of the fire extinguishing agent in the fire extinguishing agent tank acts thereon, the spray hole portion is broken and provides a spray hole, thereby allowing the fire extinguishing agent to be sprayed.

* * * * *